(12) United States Patent
Stearns

(10) Patent No.: US 8,630,404 B2
(45) Date of Patent: Jan. 14, 2014

(54) ITERATIVE SCHEDULING AND CAMPAIGN MANAGEMENT

(75) Inventor: William Nathan Stearns, Arlington, TX (US)

(73) Assignee: IEX Corporation, Richardson, TX (US)

( * ) Notice: Subject to any disclaimer, the term of this patent is extended or adjusted under 35 U.S.C. 154(b) by 546 days.

(21) Appl. No.: 12/642,881

(22) Filed: Dec. 21, 2009

(65) Prior Publication Data

US 2011/0150208 A1 Jun. 23, 2011

(51) Int. Cl.
*H04M 3/00* (2006.01)

(52) U.S. Cl.
USPC .................. 379/266.07; 379/266.01

(58) Field of Classification Search
USPC ........ 379/266.01–266.1, 265.01–265.14, 309
See application file for complete search history.

(56) References Cited

U.S. PATENT DOCUMENTS

| | | | |
|---|---|---|---|
| 7,761,321 B2 * | 7/2010 | Kannan et al. ................ | 705/7.13 |
| 8,078,486 B1 * | 12/2011 | McLean et al. ............... | 705/7.14 |
| 8,116,447 B2 * | 2/2012 | Caspi et al. ............... | 379/357.02 |
| 2004/0022383 A1 * | 2/2004 | Duncan et al. ............ | 379/265.01 |
| 2007/0127699 A1 * | 6/2007 | Lenard ........................... | 379/352 |

* cited by examiner

Primary Examiner — William Deane, Jr.
(74) Attorney, Agent, or Firm — David H. Judson

(57) ABSTRACT

An iterative scheduling and campaign management process uses a WFM system and a CLM system. These systems may be independent or consolidated. In a first step of the process, the WFM system provides the CLM system coarse agent availability data. The coarse agent availability data is used by the CLM system to generate a first list order for a given outbound contact list, which contact list is then provided back to the WFM system. In a second step of the process, the WFM uses the first list order to facilitate a multi-skilled agent scheduling routine. The resulting set of multi-skilled agent schedules (or staffing level data derived from those schedules) is then provided by the WFM system to the CLM system. The CLM system then uses the multi-skilled agent schedules (or staffing level data) to create a second list order for the given outbound contact list. This list may be considered an optimized list given the agent schedule data provided by the WFM system. The outbound campaign is then initiated. Thereafter, and periodically during the outbound campaign, the WFM system provides the CLM system intraday (or intra-campaign) updates to the multi-skilled agent schedules and, in response, the CLM creates at least one re-optimized list order for the contact list based on the intraday data update received from the WFM system. The process can then be repeated iteratively throughout the campaign.

21 Claims, 2 Drawing Sheets

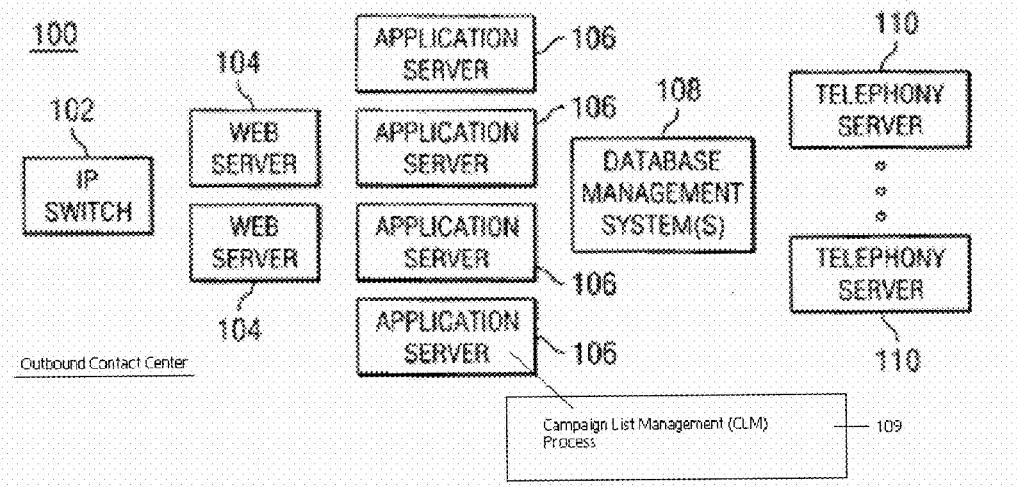
FIG. 1
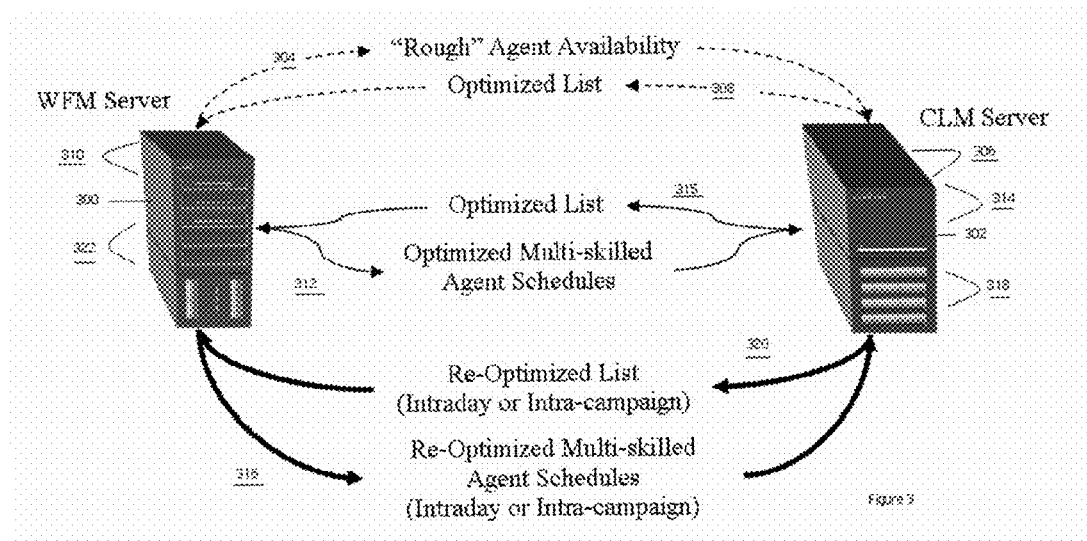

ITERATIVE SCHEDULING AND CAMPAIGN MANAGEMENT

BACKGROUND

1. Technical Field

This disclosure relates generally to a method and system for managing interactive communication campaigns.

2. Description of the Related Art

It is known to provide systems or hosted solutions through which a business entity can create and manage an "outbound" communications campaign. An example of an interactive communications campaign is a telephone campaign to determine whether a target person desires to take a given action, or to remind that person about some event. Such outbound campaigns may also offer the person an opportunity to be connected to a customer representative. One such system may be an outbound telemarketing service. In this example, a business entity accesses the service through a web-based portal and provisions an outbound calling campaign. The targets are identified and managed by a campaign and list management (CLM) process, which typically uses historical connect patterns or demographic modeling to determine when a connect to a given target is most likely to be completed successfully. The output of the CLM process is a set of targets (or their respective phone numbers) ordered in a best time-to-call sequence. At a designated time, the service provider initiates the campaign, e.g., by providing the contacts to a set of telephone servers that set-up and manage the telephone calls to the targets of the campaign. During a given outbound call, as noted, a recipient may be afforded an option to connect to a contact center, e.g., to speak to a customer representative. In such implementations, the hosted solution typically is integrated directly with the contact center's on-premises automatic call distributor (ACD).

Workforce management systems are well-known in the prior art. Such systems integrate many management functions, such as workforce forecasting and scheduling, skill planning and scheduling, multimedia contact management, real-time schedule adherence, and the like. A representative commercial system of this type is TotalView®, from IEX Corporation. Such systems generate forecasts of call received volumes and call handling times based on historical data to determine how much staff will be needed at different times of the day and week; they then create schedules that match the staffing to the anticipated needs.

While known CLM and WFM systems are useful for their intended purposes, these functions have been independent. Moreover, CLM systems have several problems, foremost in that historical connect patterns are derived from data evidencing when agents have been scheduled in the past rather than data concerning when agents should be scheduled in the future. Moreover, CLM models do not consider skills-based agent availability, and they do not have the capability of optimizing the contact list as staffing changes occur, as they do inevitably.

BRIEF SUMMARY

A CLM system is optimized by implementing a list ordering process that uses coarse (or "rough") agent availability data from a WFM system to create a CLM "best time-to-call" list order, where the agent availability data is data from actual agents. In a preferred embodiment, the agent availability data is multi-skill agent availability data from actual agents.

An iterative scheduling and campaign management process uses a WFM system and a CLM system. These systems may be independent or consolidated. In a first step of the process, the WFM system provides the CLM system coarse agent availability data. The coarse agent availability data is used by the CLM system to generate a first list order for a given outbound contact list, which contact list is then provided back to the WFM system. In a second step of the process, the WFM uses the first list order to facilitate a multi-skilled agent scheduling routine. The resulting set of multi-skilled agent schedules is then provided by the WFM system to the CLM system; in the alternative, the data provided by the WFM to the CLM system are staffing levels derived from actual agent schedules. The CLM system then uses the information provided by the WFM system (multi-skilled agent schedules or staffing level data derived from such schedules) to create a second list order for the given outbound contact list. This list may be considered an optimized list given the multi-skilled agent schedules (or staffing level data) been provided by the WFM system. The outbound campaign is then initiated. Thereafter, and periodically during the outbound campaign, the WFM system provides the CLM system intraday (or intra-campaign) updates to the multi-skilled agent schedules and, in response, the CLM creates at least one re-optimized list order for the contact list based on the intraday data update received from the WFM system. The process can then be repeated iteratively throughout the day or campaign, as the case may be.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

FIG. 1 is a block diagram of a prior art service provider infrastructure for implementing a managed communications campaign service;

FIG. 3 is a simplified process diagram of an iterative scheduling and campaign management technique of this disclosure.

DETAILED DESCRIPTION

Figure 2:
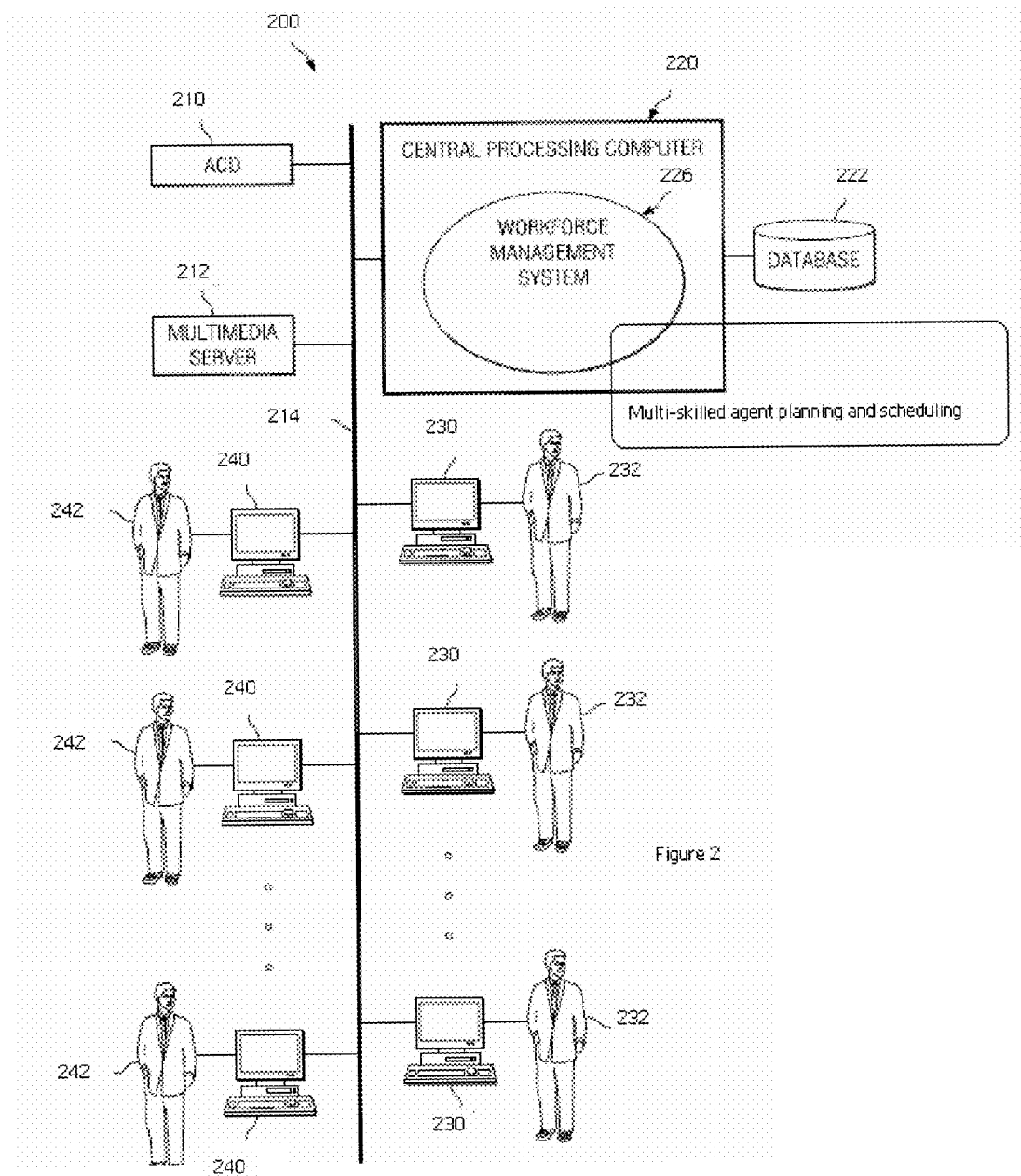
FIG. 2 is a block diagram of a prior art workforce management (WFM) system.

FIG. 1 illustrates a representative service provider or system architecture, which in the preferred embodiment is implemented in or across one or more data centers. A data center typically has connectivity to the Internet. The system provides a web-based hosted solution through which business entities create and manage outbound communications campaigns. Campaigns may be interactive or non-interactive. The particular type of campaign is not a limitation or feature of the invention.

The campaign may be implemented in other than a hosted solution; thus, for example, an enterprise may provide a standalone solution (with network interfaces, computing machines, dialers, application software, and the like) to provide a standalone solution. Such commercial systems are well-known in the prior art.

In a representative hosted solution, a business entity (a "client") user has a machine such as a workstation or notebook computer. Typically, a business entity user accesses the service provider architecture by opening a web browser on the machine to a URL associated with a service provider domain. Access may also be through an automated process, such as via a Web services application programming interface (API). Where a web browser is used, the client authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, and a set of one or more telephony server machines 110. A representative web server machine 104 comprises commodity hardware (e.g., Intel-based), an operating system such as Linux, and a web server such as Apache 2.x. A representative application server machine 106 comprises commodity hardware, Linux, and an application server. The database management system 108 may be implemented as an Oracle (or equivalent) database management package running on Linux. A representative telephony server machine is an application server that implements appropriate software applications for call set-up, voice processing, and other call connection and management activities. In the alternative, a telephony server machine may execute an application server in conjunction with one or more PSTN, VoIP and/or voice processing cards that provide interconnectivity for telephone-based calling applications. An application server 106 may execute one or more applications, such as a campaign and list management (CLM) process or processes 109. A CLM process identifies targets and creates target contact "lists." A conventional CLM process typically uses historical connect patterns or demographic modeling to determine when a connection to a given target is most likely to be completed successfully. As noted above, the output of the CLM process is a set of targets (or their respective phone numbers) ordered in a best time-to-call sequence.

Typically, a voice processing application port or card has a finite number of supported ports. In a high volume call environment, there may be several web server machines, several application server machines, and a large number of telephony server machines. Although not shown in detail, the infrastructure may include a name service, FTP servers, MRCP (Media Resource Control Protocol) servers, load balancing appliances, other switches, and the like. Each machine typically comprises sufficient disk and memory, as well as input and output devices. Generally, the web servers 104 handle incoming business entity provisioning requests, and they export a management interface. The application servers 106 manage the basic functions of generating campaign scripts, managing contacts, and executing campaigns. The telephony servers 110 handle most telephony-related functions including, without limitation, executing outbound calls and forwarding calls to a contact center. The particular hardware and software implementation details described herein are merely for illustrative purposes are not meant to limit the scope of the present invention.

In a representative embodiment, a typical machine in the service infrastructure is a processor-based server running Linux, and the server includes a telephone interface. A typical interface has a given number of ports, and each port may be considered a separate telephone line. There are typically a set of such servers operating at a given location (e.g., an Internet data center). The following is a typical operation of the service. Using a Web browser or the Web service API, a client provisions a campaign, provisioning a script to be played. The client also provides the service provider with contact information for a set of persons, who are the target recipients of the campaign. In operation, the system provides these contacts to one of the machines in the server farm. A control routine executing on the machine takes a first contact in the subset and assigns the contact to an available port. The script is then initiated and the interface card initiates a call over a port. When the recipient's phone is answered, the system determines whether a human being has answered the call (as opposed to an answering machine, a fax, or the like). If a human being has answered, the script plays a set of prompts (basically a set of scripted questions). During the outbound call, the target recipient may take a given action and, as a consequence, he or she is connected to an agent. An "agent" typically is a contact center operator.

The hosted version is just one embodiment; as noted above, the functionality may also be implemented in a standalone (non-hosted) manner. In such an alternative embodiment, a skilled artisan will appreciate that similar machines, devices, interfaces and software as described above are also present.

FIG. 2 is a typical workforce management system (WFM), as is known in the prior art. Such systems integrate many management functions, such as workforce forecasting and scheduling, skill planning and scheduling, multimedia contact management, and the like. In the following discussion, the subject matter is described in the context of a contact center environment, although it should be understood that the techniques described herein can be practiced in other types of environments such as, without limitation, back office environments, sales force environments, field service environments, manufacturing environments, airports, airlines, government agencies, casinos, banks, retail stores, warehouses, and other types of environments wherein entities (agents, employees, contractors, other persons, or the like) work according to assigned schedules. In a contact center, the environment generally comprises an automatic call distributor (ACD), and/or one or more multimedia server(s) coupled to a host computer via a computer network. The ACD is coupled to a communications network. The ACD and multimedia server(s) generally provide routing capabilities for incoming voice calls (via the ACD) and other contacts (via the multimedia server), such as faxes, email, voice mail, web requests, web call-back requests, web chats, web voice calls, web video calls, and the like. A "schedule" is any ordered list of times at which given events or activities are planned to occur.

Referring to FIG. 2, the reference numeral 200 generally designates a workforce contact center environment. As noted above, the environment 200 generally comprises an automatic call distributor (ACD) 210 and a multimedia server 212 coupled to a central processing computer 220 via a network 214, such as a wireline and/or wireless local area network (LAN), a wireline and/or wireless wide area network (WAN), the Internet, an Intranet, or the like. As also described above, the ACD 210 and multimedia server 212 generally provide routing capabilities for incoming voice calls (via the ACD) and other contacts (via the multimedia server). The function and operation of the ACD 210 and multimedia server 212 are considered to be well-known to a person having ordinary skill in the art. The central processing computer 220 receives from the ACD 210 and the multimedia server 212 periodic contact information, such as the number of contacts handled ("in contacts"), the amount of time an agent spends on incoming contacts ("talk time"), the amount of time an agent spends after the talk time for administrative duties related to contact resolution ("work time"), the amount of time an agent spends in talk time and work time ("total time"), the amount of time an agent spends available to take a call or handle a contact ("available time"), the amount of time an agent spends in an auxiliary state and/or is unable to take a call ("aux time" and/or "break time"), the number of outgoing contacts made by the agent ("out contacts"), the time spent on the outgoing contacts ("out time"), the elapsed time spent logged into the system (e.g., ACD or multimedia server) ("system time"), and the like, and preferably stores the information in a database 222 coupled to the central processing computer 220, preferably at 15-30 minute intervals or real time.

A workforce management system 226 provides workforce forecasting and scheduling, skill planning and scheduling, multimedia contact management, and the like. While the database 222 is shown external to the computer, one skilled in the art will appreciate that the database 222 may be included within the central processing computer 220, or that the data be retrieved from any other location when needed. The central processing computer 220 is also coupled via the network 214 to one or more agent workstations 230 and to one or more supervisor workstations 240, which provide an interface between the workforce management system 226 and one or more agents 232 and supervisors 242, respectively. The agent workstations 230 and the supervisor workstations 240 are preferably configured to access the central processing computer 220 through the network 214 via a browser, such as a Java-enabled web browser, a Windows-based application, a Java application or ActiveX control, or any other client technology or functionality. As is well-known, agents 232 access, via the telephone (not shown) and agent workstation 230, the ACD 210, multimedia server 212, or other contact servers (not shown) to aid in contact resolution. As the agents 232 service the contacts, the ACD 210 and the multimedia server 212 collect performance and other data for each of the agents 232. The performance data of the agents 232, such as the in contacts, talk time, work time, total time, available time, aux time, out contacts, out time, system time, and the like, are sent periodically by the ACD 210 and the multimedia server 212 to the central processing computer 220 and, preferably, stored in the database 222.

The workforce management (WFM) system 226 is a suite of one or more software-driven systems that provide workforce forecasting and scheduling, skill planning and scheduling, multimedia contact management, and the like, and that provides an interface to the database 222. A representative commercial system of this type is TotalView® workforce management, from IEX Corporation.

In a typical WFM system, contacts that arrive at a contact center generally are classified into "contact types." As noted above, the contact center is typically served by an automatic call distributor (ACD) or other multimedia server, which identifies the contact type of each incoming contact and either delivers or queues it. Each contact type may have a separate first-in-first-out queue in the ACD or server. In most existing contact centers, the agents answering calls or responding to contacts are organized into one or more "teams," with each team having primary responsibility of the calls in one or more queues. This paradigm is sometimes referred to as "queue/team." In the queue/team model, scheduling for each team can be done independently. Suppose, for example, that the contact center handles calls for Sales, Service, and Billing, and that each of these contact types is served by a separate team. The schedule for Sales agents will depend on the forecast for Sales call volume and on various constraints and preferences applicable to the agents being scheduled, but this schedule is not affected by the call volume forecast for Service or Billing. Further, within the Sales team, agents can be considered interchangeable from a call handling viewpoint. Thus, within a team, schedule start times, break times and the like, may be traded freely among agents in the team to satisfy agent preferences without affecting scheduled call coverage.

It is also known in the prior art to provide ACD systems that depart from the queue/team model described above. Calls are still categorized into contact types. In place of queues for the contact types, however, queues associated with "skills" are provided. The ACD's call distribution logic for the contact type determines which queue or queues a contact will occupy at various times before it is answered. In this approach, agents are not organized into teams with exclusive responsibility for specific queues. Instead, each agent has one or more identified "skills" corresponding to the skills-based queues. Thus, both a given contact and a given agent may be connected to multiple queues at the same time. Agent skills designations may be further qualified, for example, as "primary" or "secondary" skills, or with some other designation of skill priority or degree of skill attainment. The ACD or server contact distribution logic may take the skill priority levels into account in its call distribution logic. A technique for skills-based planning and scheduling in a workforce contact center environment of this type is described in commonly-owned U.S. Pat. No. 6,970,829, the disclosure of which is incorporated herein by reference.

As noted above, CLM systems are currently available to accomplish the contact list ordering process. Generally, CLM systems are well known for the ability to manage outbound dial attempts and disposition for each number in a list of phone numbers. Basic functions of a CLM system include (a) removing duplicate numbers; (b) sorting numbers based on specific attributes, such as area codes; (c) applying filters and rules for regulatory compliance regarding outbound dialing rules; (d) pacing algorithms to balance call attempts against agent utilization and caller abandons; and (e) monitoring for answer detection and re-queuing numbers for redial attempts. More advanced CLM systems apply additional logic and processing to organize the list into a "best time to call" sequence based on (a) demographic information; (b) specific account holder information; (c) processing rules based on predictive customer behavior algorithms; and (d) historical connect patterns. While much effort has been developed to optimize the list for best time to call using the aforementioned algorithms, rules, and processes, CLM systems give no or only cursory consideration to the workforce staffing work rules, agents skills (including blended inbound/outbound skills as well as multimedia skills), actual agents schedules, planned off-dialer activities, and other WFM-specific information.

Furthermore, after a list is optimized for "best time to call" sequencing, there is no iterative process to continually reconcile the "best time to call" sequencing with constantly changing agent schedules and skill usage. This causes a discrepancy between the "best time to call" and the actual availability of the staff. This disclosure addresses this problem. In particular, the techniques described herein provide iterative optimization and processing of agent schedules (and, preferably, multi-skilled agent schedules) and schedule updates to this list optimization process. In a preferred embodiment, multi-skilled agent availability data is used to facilitate best time-to-call list ordering. Further, according to another aspect of the disclosure, automated list re-ordering is effected when the multi-skilled agent availability changes (e.g., during the day or campaign). The preferred technique is illustrated in FIG. 3, and it is now described below.

An iterative scheduling and campaign management process uses a WFM system 300 and a CLM system 302. These systems may be independent or consolidated, and they generally include the functions and features described above. In step 304 of the process, the WFM system 300 provides the CLM system 302 coarse agent availability data. The coarse agent availability data is used by the CLM system 302 at step 306 to generate a first list order for a given outbound contact list, which contact list is then provided back to the WFM system at step 308. In the alternative to the CLM providing a "contact list" (which is a list of calling records), the CLM may provide the WFM staffing level data or workload data, where workload could be total work time or work items and work time per item, or some other workload representation. At step 310 of the process, the WFM system 300 uses the first list order (or alternative data provided by the CLM) to facilitate a multi-skilled agent scheduling routine. At step 312, the resulting set of multi-skilled agent schedules is then provided by the WFM system 300 to the CLM system 302. In an alternative embodiment, the WFM system 300 provides the CLM system 302 actual staffing levels (or "scheduled agents per interval" data), or, more generally, staffing levels derived from actual agent schedules. At step 314, the CLM system 302 then uses the multi-skilled agent schedules (or the alternative information such as described above) to create a second list order for the given outbound contact list. This list may be considered an "optimized" list given the agent schedules data it has been provided by the WFM system 300. The term "optimized" should not be taken to require any specific optimization parameter, constraint or metric, however. The second list order is provided from the CLM system to the WFM system at step 315. The outbound campaign is then initiated by one or more systems (not shown in this figure). Thereafter, and periodically during the outbound campaign, the WFM system 300 provides the CLM system 302 intraday (or intra-campaign) updates to the multi-skilled agent schedules. These updates are represented by the arrows designated as step 316. In response, the CLM system 302 creates at least one re-optimized list order for the contact list based on the intra-day (or intra-campaign) data update received from the WFM system 300. This is step 318. At step 320, this re-optimized list order is provided from the CLM system 302 back to the WFM system 300. The WFM system 300 creates updated multi-agent schedules as desired, which is indicated at step 322. The above-described process can then be repeated iteratively throughout the day or campaign, as the case may be.

One skilled in the art will appreciate that the above-described technique replaces the conventional list ordering process (that uses historical connect patterns) with a technique that uses rough future availability of agent data, together with optimized multi-skilled schedule generation using a best time-to-call list order as the input to the schedule generation process. The described technique is advantageous as it provides skill group availability data to the CLM list ordering process. Such skill group availability data may be derived in any convenient manner, such as from a simulation of multi-skilled agents. One such simulation technique is described in commonly-owned U.S. Pat. No. 6,044,355, the disclosure of which is incorporated herein by reference. Preferably, the described technique also ensures that the WFM system provides the CLM system frequent and iterative updates of skill group availability for the CLM list re-ordering process; as a corollary, the CLM system then provides the WFM system frequent and iterative updates of the forecast connects.

Thus, the WFM system seeds the CLM system with rough availability of future agent capacity, preferably with respect to multi-skilled agents. The WFM system receives the best time-to-call list order and uses it to create preferably multi-skilled agent schedules. After the campaign begins, the system moves into a change management mode of operation, during which changes to agent availability (as recognized by the WFM system) provides new data for the CLM process; the iterative scheduling and campaign management then continues with the CLM and WFM processes continually updating one another in the manner previously described.

The technique disclosed herein increases the accuracy of list ordering by using actual agent schedules for the initial CLM process output. Moreover, as agent schedules change throughout a schedule period (e.g., a given day, or during a given campaign), the list order is automatically optimized based on those changes.

By integrating the WFM processes of forecasting, planning, schedule generation and change management with the CLM processes of list optimization, the discrepancies between the "best time to call" and the actual availability of the staff can be minimized or removed. In a fully integrated and iterative WFM/CLM business process, the workforce staffing work rules, agents skills (including blended inbound/outbound skills as well as multimedia skills), actual agents schedules, planned off-dialer activities, and other WFM-specific information can be used as additional inputs in the optimization algorithms of the CLM system. The end result is a more accurate "best time to call" sequence based not only on account demographics and historical patterns, but also skilled agent resources, even in the most complex environments that use blended inbound/outbound/multimedia multi-skilled agents.

The may be variations of the techniques described. Any of the types of data that are output from one of the systems (whether WFM or CLM) may be provided to the other. Thus, and as one non-limiting example, in place of agent availability or staffing level data being sent from the WFM system to the CLM system, other types of data (such as a number of outbound callas, AHT per interval, or some other workload value) may be provided.

A skilled artisan thus will appreciate that the disclosed techniques provide for synchronized iterative integrations between the WFM processes (schedule optimization) and the CLM processes (list optimization). A synchronized iterative integration typically comprises the providing of a data set from a system to the other system for use in the receiving system, following by the providing of a data set back to the sending system, and so forth, as described above. A processor-based apparatus for implementing such synchronized iterative integrations thus is within the scope of this disclosure.

As noted above, although the CLM and WFM processes are shown as independent and distinct, this is not a limitation of the disclosed subject matter. One or more of the functions therein (or the overall systems themselves) may be integrated to facilitate the disclosed invention. In one embodiment, the functions represented in FIG. 3 are implemented in a computer program product in a computer readable medium, the computer program product holding computer program instructions that when executed by one or more data processors perform an iterative scheduling and campaign management method. Preferably, the processing herein is carried out with at least one of the processing steps being performed in a computer so as to implement a machine-implemented method. Typically, the computer is a "special purpose" or "particular" machine such as a CLM server, a WFM server, or some combination thereof.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

As previously noted, the hardware and software systems in which the subject matter herein is illustrated are merely representative. The described functionality may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation. A given machine includes network interfaces and software to connect the machine to a network in the usual manner. As illustrated in FIG. 1, the subject disclosure may be implemented as a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

Having described our invention, what we now claim is set forth below.

The invention claimed is:

1. A computer program product in a non-transitory computer readable medium for managing a campaign and schedules associated with the campaign, the computer program product holding computer program instructions executable by a data processing system having a hardware component, the computer program instructions comprising:
   program code to receive, by a campaign and list management (CLM) process, agent availability data, the agent availability data being generated in a workforce management (WFM) process;
   program code to use, by the CLM process, the agent availability data to generate a first contact list order for a contact list;
   program code to provide, by the CLM process to the WFM process, the first contact list order;
   program code to use, by the WFM process, the first contact list order to generate a set of agent schedules;
   program code to provide, by the WFM process to the CLM process, staffing level data derived from the agent schedules; and
   program code to use, by the CLM process, the staffing level data to generate a second contact list order.

2. The computer program product as described in claim 1 wherein the agent availability data is multi-skilled agent availability data.

3. The computer program product as described in claim 2 wherein the set of agent schedules are a set of multi-skilled agent schedules.

4. The computer program product as described in claim 1 wherein the computer program instructions further include program code to cause the WFM process to provide the CLM process with an update to the staffing level data.

5. The computer program product as described in claim 4 wherein the update to the staffing level data is provided during a given time interval or campaign.

6. The computer program product as described in claim 5 wherein the computer program instructions further include program code to cause the CLM process to use the update to the staffing level data to generate a third contact list, the third contact list order being a re-optimized list order.

7. The computer program product as described in claim 6 wherein the computer program instructions further include program code to provide the third contact list order from the CLM process to the WFM process.

8. Apparatus for campaign and list management (CLM), comprising:
   a hardware-based processor;
   computer memory holding computer program instructions that when executed by the hardware-based processor perform a method, the method comprising:
      receiving agent availability data, the agent availability data being generated in a workforce management (WFM) process;
      using the agent availability data to generate a first contact list order for an outbound contact list;
      providing the first contact list order for the outbound contact list to the WFM process;
      receiving from the WFM process a set of agent schedules, the set of agent schedules being generated from the first contact list order; and
      using the set of agent schedules to generate a second contact list order.

9. The apparatus as described in claim 8 wherein the agent availability data is multi-skilled agent availability data.

10. The apparatus as described in claim 8 wherein the set of agent schedules are multi-skilled agent schedules.

11. The apparatus as described in claim 8 wherein the method further includes receiving from the WFM process a set of updated agent schedules.

12. The apparatus as described in claim 11 wherein the method further includes using the updated agent schedules to generate a third contact list, the third contact list order being a re-optimized list order.

13. The apparatus as described in claim 12 wherein the third contact list order is generated intra-day or intra-campaign.

14. Apparatus for workforce management (WFM), comprising:
   a hardware-based processor;
   computer memory holding computer program instructions that when executed by the hardware-based processor perform a method, the method comprising:
      generating agent availability data;
      providing the agent availability data to a campaign list management (CLM) process;
      receiving from the CLM process a first contact list order for an outbound contact list;
      using the first contact list order to generate a set of agent schedules; and providing staffing level data derived from the set of agent schedules to the CLM process.

15. The apparatus as described in claim 14 wherein the agent availability data is multi-skilled agent availability data.

16. The apparatus as described in claim 14 wherein the set of agent schedules are multi-skilled agent schedules.

17. The apparatus as described in claim 14 wherein the method further includes receiving from the CLM process a second contact list order, the second contact list order having been generated by the CLM process using the staffing level data.

18. The apparatus as described in claim 17 wherein the method further includes using the second contact list order to generate an updated staffing level data that is then provided back to the CLM process.

19. The apparatus as described in claim 18 wherein the updated agent schedules are generated intra-day or intra-campaign.

20. A computer program product in a non-transitory computer readable medium for managing a campaign and schedules associated with the campaign, the computer program product holding computer program instructions executable by a data processing system having a hardware element, the computer program instructions comprising:
- program code to receive, by a campaign and list management (CLM) process, agent availability data, the agent availability data being generated in a workforce management (WFM) process;
- program code to use, by the CLM process, the agent availability data to generate given information for a first contact list;
- program code to provide, by the CLM process to the WFM process, the given information;
- program code to use, by the WFM process, the given information to generate a set of agent schedules;
- program code to provide, by the WFM process to the CLM process, staffing level data derived from the agent schedules; and
- program code to use, by the CLM process, the staffing level data to generate new given information for a second contact list.

21. The computer program product as described in claim 20 wherein the given information is one of: staffing levels data, and workload data.

\* \* \* \* \*